United States Patent
Nyren

(10) Patent No.: US 10,850,821 B2
(45) Date of Patent: *Dec. 1, 2020

(54) SPRING-ASSISTED JACK PLATE FOR OUTBOARD MOTOR

(71) Applicant: Powrtran Inc., St. Cloud, MN (US)

(72) Inventor: Gary Nyren, St. Augusta, MN (US)

(73) Assignee: Powrtran Inc., St. Cloud, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/533,157

(22) Filed: Aug. 6, 2019

(65) Prior Publication Data
US 2020/0062360 A1 Feb. 27, 2020

Related U.S. Application Data

(63) Continuation of application No. 15/563,917, filed as application No. PCT/US2016/025029 on Mar. 30, 2016, now Pat. No. 10,370,075.

(60) Provisional application No. 62/140,340, filed on Mar. 30, 2015.

(51) Int. Cl.
| B63H 20/06 | (2006.01) |
| B63H 20/10 | (2006.01) |
| B63H 20/08 | (2006.01) |
| F15B 7/06 | (2006.01) |
| F02B 61/04 | (2006.01) |
| F16C 29/02 | (2006.01) |

(52) U.S. Cl.
CPC .......... *B63H 20/106* (2013.01); *B63H 20/06* (2013.01); *B63H 20/08* (2013.01); *F15B 7/06* (2013.01); *F02B 61/045* (2013.01); *F16C 29/02* (2013.01)

(58) Field of Classification Search
CPC ...... B63H 20/106; B63H 20/06; B63H 20/08; F15B 7/06; F16C 29/02; F02B 61/045
See application file for complete search history.

(56) References Cited

U.S. PATENT DOCUMENTS

| 2,775,219 | A | * | 12/1956 | Curtis | B63H 20/106 440/61 R |
| 4,624,438 | A | * | 11/1986 | Goodman, Jr. | B63H 20/106 248/642 |
| 4,995,839 | A | * | 2/1991 | Havins | B63H 5/08 114/274 |
| 8,267,025 | B2 | * | 9/2012 | Witte | B63H 20/106 114/53 |
| 9,598,159 | B2 | * | 3/2017 | Nyren | B63H 20/08 |
| 10,370,075 | B2 | * | 8/2019 | Nyren | B63H 20/06 |

* cited by examiner

Primary Examiner — Stephen P Avila
(74) Attorney, Agent, or Firm — Christensen, Fonder, Dardi & Herbert PLLC

(57) ABSTRACT

A jack plate includes a mounting assembly having first and second spacing brackets connected by a transom plate adapted for mounting to the transom of a boat, each of the spacing brackets having inwardly facing channels at rearward sides of the spacing brackets. The jack plate further includes a motor lift including a lift plate extending between a first bearing and a second bearing, the channels adapted to conformingly receive the first and second bearings. An actuator is provided to raise and lower the lift plate relative to the transom plate. At least one spring is operably coupled between the mounting assembly and the motor lift, the spring unloading the lift plate to re-duce load on the actuator. The spring is optionally a compression gas spring.

19 Claims, 12 Drawing Sheets

SPRING-ASSISTED JACK PLATE FOR OUTBOARD MOTOR

CROSS-REFERENCE TO RELATED APPLICATIONS

This application is a continuation of U.S. patent application Ser. No. 15/563,917, filed Oct. 2, 2017, now U.S. Pat. No. 10,370,075, issuing Aug. 6, 2019, and which is a National State Entry of PCT/US2016/025029, filed Mar. 30, 2016, which claims the benefit of U.S. Provisional Application No. 62/140,340 filed on Mar. 30, 2015, the disclosures of which are incorporated by reference herein in their entireties.

FIELD OF THE DISCLOSURE

The present invention relates to a mechanism for mounting outboard motors onto boats. More specifically, the present invention relates to a jack plate for vertically adjusting the trim and/or height of an outboard motor.

BACKGROUND OF THE DISCLOSURE

During operation of a boat powered by an outboard motor, it is often desirable to raise or lower the motor. For example, when operating a boat in shallow water or removing a boat from the water with a submersible boat trailer, it is often necessary to raise the motor so that the propeller and rudder are not damaged by the bottom of the body of water. In other instances, it may be desirable to raise the motor while operating the boat at high speeds to reduce the amount of drag created by the presence of the motor in the water.

Adjusting the trim or height of an outboard motor can be accomplished by manipulating a set of controls operably connected to a jack plate. Although meanings of the term jack plate can 15 vary, for purposes of this application, jack plate refers to the interfacing apparatus between a boat and an accompanying outboard motor. Generally, a component of the jack plate is fixedly mounted to the transom of the boat, while another component is mounted to the outboard motor. By operating an actuator attached to the two components, the motor can be raised or lowered in relation to the transom. A number of different types of lift actuators have been incorporated into jack plates, such as, for example, hydraulic, electric, electro-mechanical, or strictly manually operated actuators.

Jack plates can accomplish raising or lowering the propeller of an outboard motor by pivoting the motor about a selected point, such as at or near the top of the transom. Pivoting an outboard motor to raise the motor, however, has several drawbacks. As the motor pivots, the angle at which the propeller displaces water changes, resulting in a decrease in the propulsive efficiency of the motor.

Because of the drawbacks associated with tilting outboard motors, jack plates have been developed that can raise or lower the entire outboard motor in a substantially vertical direction. For example, U.S. Pat. Nos. 8,627,779 and 8,267,025, both of which are incorporated herein by reference, show an actuator-powered jack plate having a transom plate mountable to a boat transom and a motor lift plate movable substantially vertically with respect to the transom plate. The larger the motor mounted to the motor lift plate, the greater the load that must be accommodated by the actuator to raise and lower the motor with respect to the boat. Accordingly, more powerful and/or more durable actuators have been called for to maintain performance over time with larger motors.

SUMMARY

In an embodiment, a jack plate comprises a mounting assembly comprising a first spacing bracket, a second spacing bracket, and a transom plate extending between the first spacing bracket and the second spacing bracket. The first spacing bracket defines a first channel and the second spacing bracket defines a second channel with the first channel and the second channel opening toward one another. The jack plate further includes a lift plate assembly that is movable relative to the mounting plate. The lift plate assembly comprises a first slider slidingly received in the first channel, a second slider slidingly received in the second channel, and a lift plate extending between the first slider and the second slider. The jack plate comprises an actuator operably coupled between the mounting assembly and the lift plate assembly for moving the lift plate assembly relative to the mounting assembly. The jack plate also includes a spring operably coupled between the mounting assembly and the lift plate assembly, the spring applying a biasing force between the lift plate assembly and the mounting assembly. The spring comprises a spring housing having a spring wall defining in a cylinder bore and a piston disposed inside the cylinder bore. The piston separates a first part of the cylinder bore from a second part of the cylinder bore. A pressurized gas is disposed in the first part of the cylinder bore. The second part of the cylinder bore is in fluid communication with the outside atmosphere A. The outside atmosphere A has an atmospheric pressure and the pressurized gas has a pressure that is greater than the atmospheric pressure so that there is a pressure differential across the piston. The spring housing also has an end portion comprising the female mounting thread that is co-axial with the cylinder bore. The actuator includes an actuator casing that defines a socket dimensioned to receive the end portion of the cylinder housing. In an embodiment, the end portion of the cylinder housing is disposed n the socket defined by the actuator casing. The end portion of the cylinder housing is fixed to the actuator casing by a mounting screw. The mounting screw disposed in threaded engagement with the female mounting thread.

In an embodiment, the piston further comprises a piston rod having a first end portion fixed to the piston and a second end portion fixed to a clevis. In this embodiment, the clevis is pivotally coupled to the transom plate by a lower pin extending through a clevis hole in the clevis and corresponding holes defined by a lower mounting bracket.

In an embodiment, the actuator casing is pivotally coupled to the lift plate by an upper pin extending through an upper mounting hole defined by the actuator rod and corresponding holes defined by an upper mounting bracket. In this embodiment, the upper mounting bracket is fixed to the lift plate.

In an embodiment, the actuator further comprises an actuator rod defining an lower mounting hole, the actuator rod being pivotally coupled to the transom plate by a lower pin extending through the lower mounting hole and corresponding holes defined by a lower mounting bracket. In this embodiment, the lower mounting bracket is fixed to the transom plate.

In an embodiment, the jack plate further includes a male washer and a female washer disposed inside the socket defined by the actuator housing with the mounting screw extending through the male washer and the female washer. The male washer and a female washer are disposed between an upward facing surface of the end portion of the spring housing and a downward facing surface of the actuator casing. The female washer comprises a female surface defining a cavity. The male washer comprises a male surface. The male surface of the male washer is received in the cavity defined by the female surface of the female washer. In an embodiment, the male surface of the male washer is seated against and in contact with the female surface of the female washer. In an embodiment the male surface of the male washer comprises at least one convex surface. In an embodiment the female surface of the female washer comprises a concave surface. In an embodiment the cavity defined by the female surface of the female washer has a shape corresponding to a cone.

In an embodiment, the spring of the jack plate is biased to expand in length and the spring is allowed to extend in length while the actuator is activated to raise the lift plate.

In an embodiment, the spring is biased to expand in length and the actuator prevents the spring from expanding in length when the actuator is not activated.

In an embodiment, the spring is biased to expand in length and the spring is forced to contract in length while the actuator is activated to lower the lift plate.

In embodiment, a boat comprises a hull having a transom, an outboard motor, and a jack plate disposed intermediate the hull and the outboard motor. In an embodiment, the jack plate includes a transom plate that is fixed to the transom of the hull. The outboard motor is fixed to a lift plate of the jack plate.

In an embodiment, a jack plate comprises a mounting assembly comprising a first spacing bracket, a second spacing bracket, and a transom plate extending between the first spacing bracket and the second spacing bracket. The first spacing bracket defines a first channel and the second spacing bracket defines a second channel with the first channel and the second channel opening toward one another. A lift plate assembly of the jack plate comprises a first slider slidingly received in the first channel and a second slider slidingly received in the second channel. A lift plate of the lift plate assembly extends between the first slider and the second slider. An actuator of the jack plate is operably coupled between the mounting assembly and the lift plate assembly for moving the lift plate assembly relative to the mounting assembly. A spring of the jack plate is operably coupled between the mounting assembly and the lift plate assembly, the spring applying a biasing force between the lift plate assembly and the mounting assembly.

In an embodiment, a jack plate includes a mounting assembly having first and second spacing brackets connected by a transom plate adapted for mounting to the transom of a boat, each of the spacing brackets having inwardly facing channels at rearward sides of the spacing brackets. The jack plate further includes a motor lift including a lift plate extending between a first bearing and a second bearing, the channels adapted to conformingly receive the first and second bearings. An actuator is provided to raise and lower the lift plate relative to the transom plate. At least one spring is operably coupled between the mounting assembly and the motor lift, the spring unloading the lift plate to reduce load on the actuator. The spring is optionally a compression gas spring.

BRIEF DESCRIPTION OF THE DRAWINGS

Embodiments of the invention will be described with respect to the figures, in which like reference numerals denote like elements, and in which.

Figure 1:
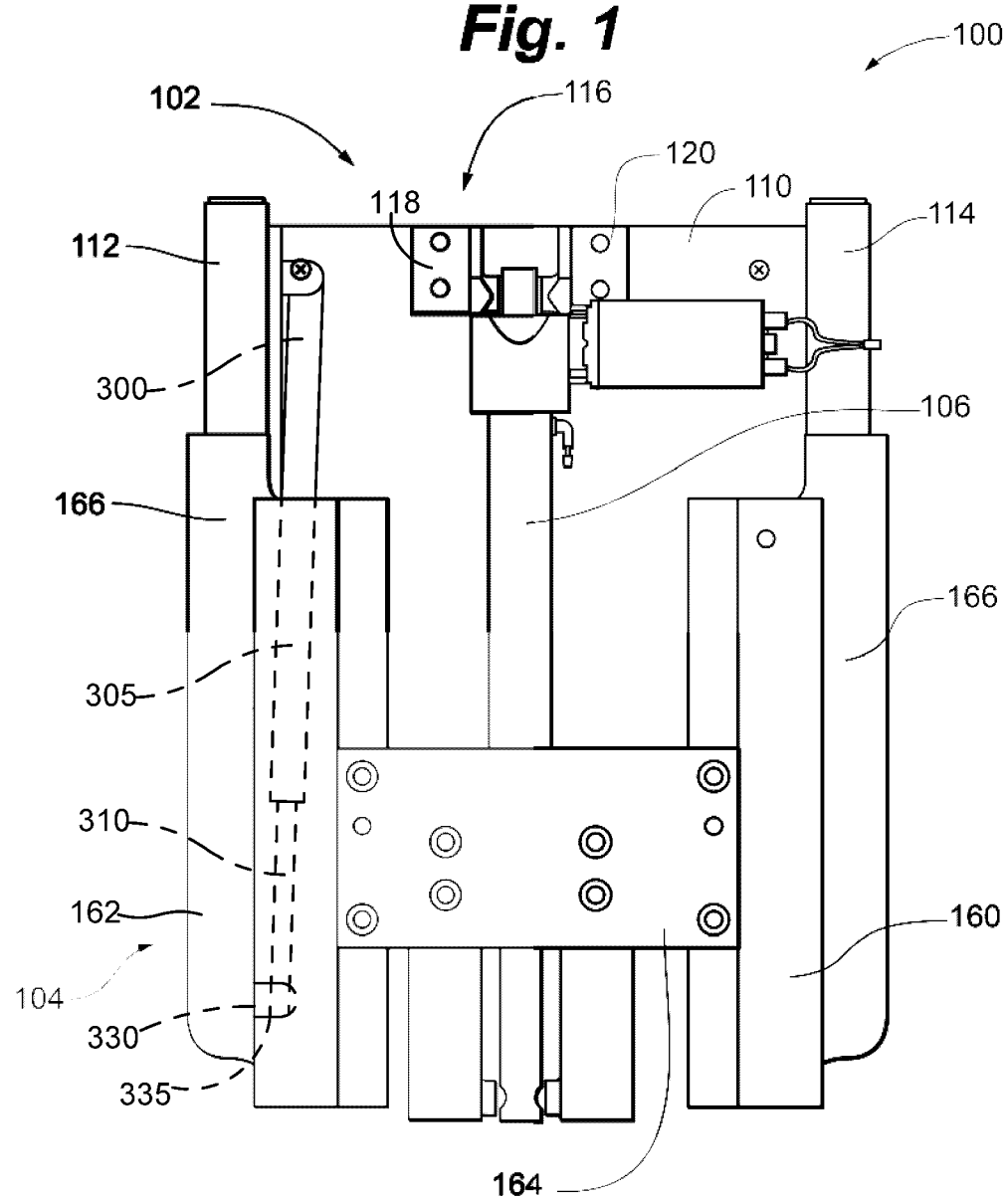
FIG. 1 is a rear view of a jack plate with an actuator and spring, according to an embodiment of the invention.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION

Referring to FIG. 1, jack plate 100 comprises motor lift 102 and jack plate mounting assembly 104. Jack plate 100 generally also includes actuator 106. In one embodiment, actuator 106 is an electro-mechanical ball screw actuator driven by an associated motor and controlled by control switch. In other embodiments, actuator 106 is an electrical, a mechanical or other type of actuator 106. Manual actuation is also contemplated, according to embodiments of the invention.

Figure 2:
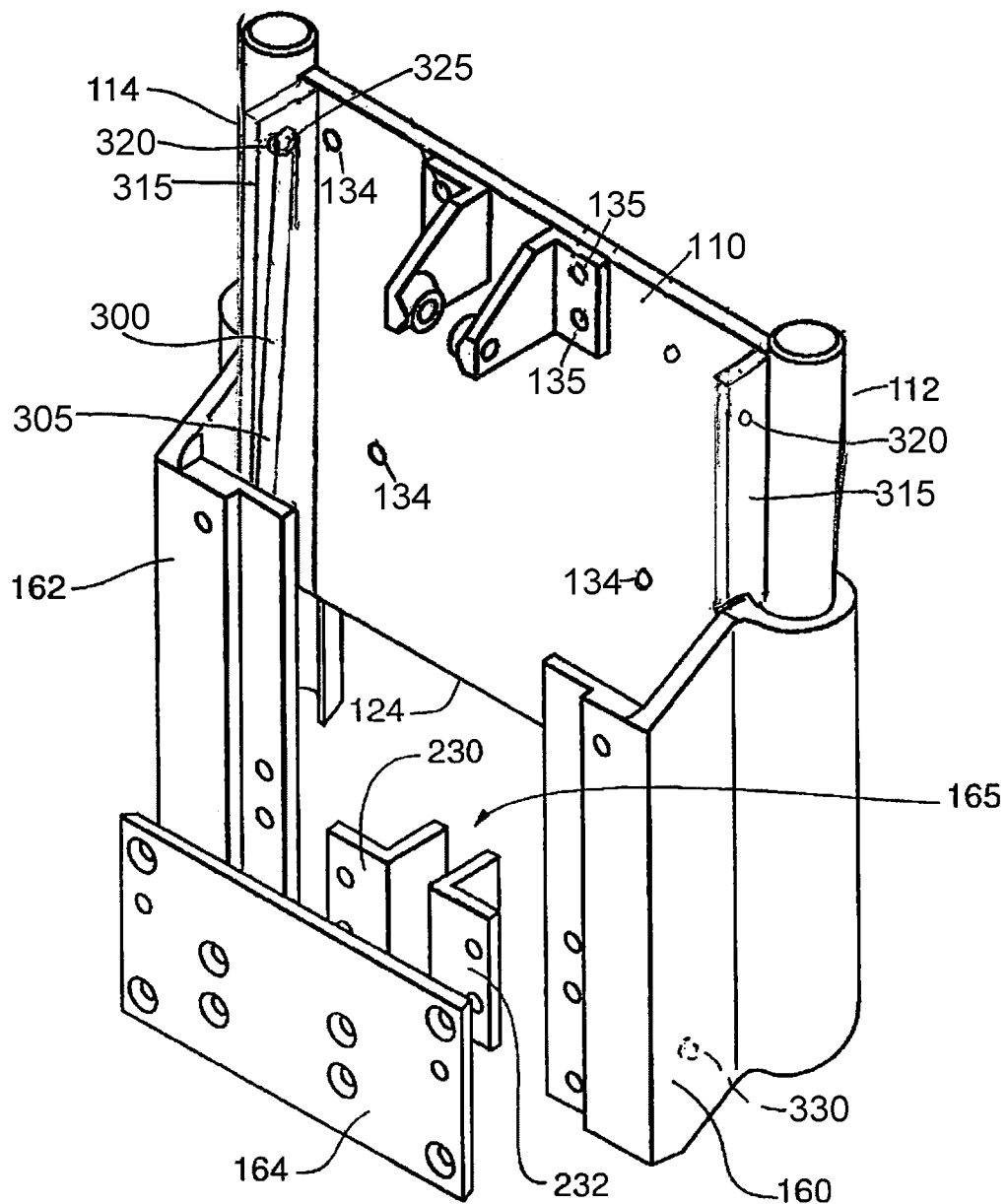
FIG. 2 is a partially exploded perspective view of a jack plate, according to an embodiment of the present invention.
Figure 3:
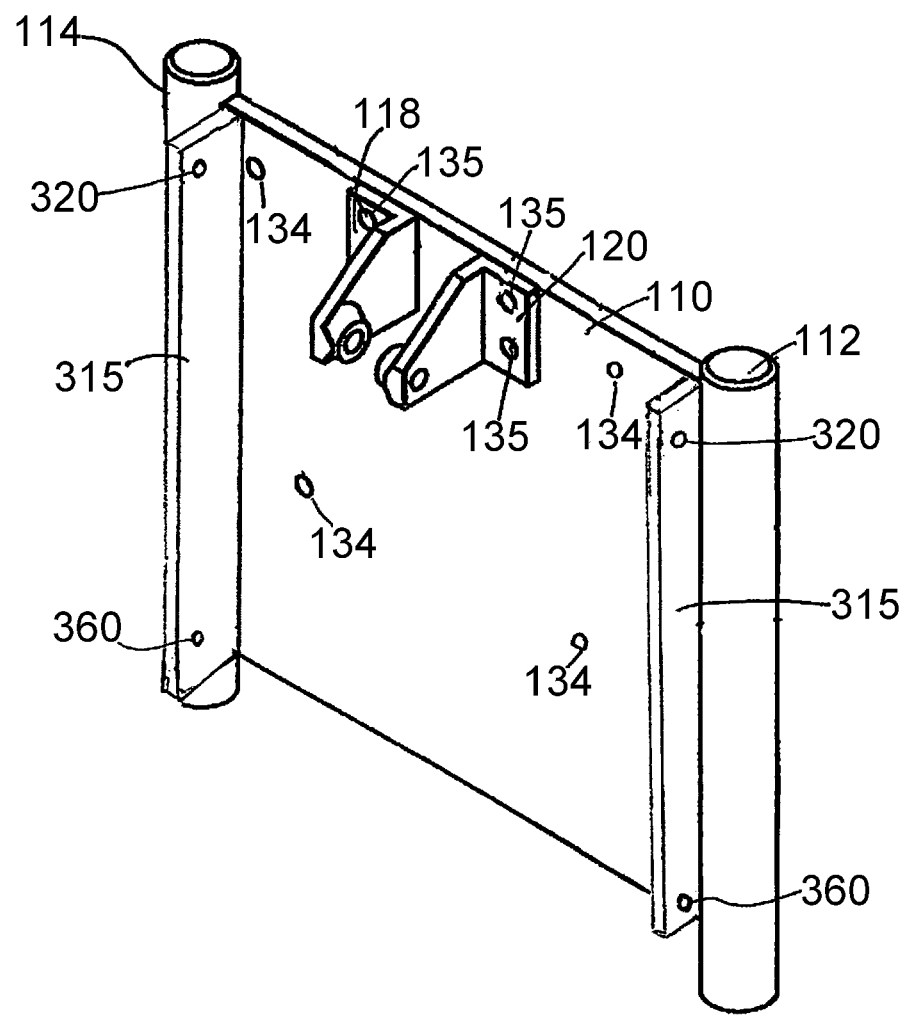
FIG. 3 is a perspective view of a motor lift, according to an embodiment of the invention.

Motor lift 102 comprises lift plate 110 and bearings 112, 114, as depicted in FIGS. 1-3. Motor lift 102 generally also includes actuator mount 116. In an embodiment, actuator mount 116 is formed from two actuator brackets 118, 120. In alternative embodiments, actuator mount 116 is formed from a single actuator bracket or from actuator mount 116 having several actuator brackets 118, 120 and/or additional components. Lift plate 110 includes motor-mounting apertures 134 and actuator mounting apertures 135.

Jack plate mounting assembly 104 also includes spacing brackets, 160, 162, transom plate 164, and actuator mount 165. Each spacing bracket 160 or 162 has jack plate rail 166. Transom plate 164 is adapted to mount to the transom or other structure associated with a boat. Actuator mount 165 supports the opposite side of actuator 106 relative to actuator mount 116. Actuator mount 165 is optionally formed from two actuator brackets 230, 232, as depicted in FIG. 2. In alternative embodiments, actuator mount 165 is formed from a single actuator bracket or from an actuator mount assembly having several actuator brackets and/or additional components.

Motor lift 102 is positioned within jack plate mounting assembly 102 by inserting bearings 112, 114 into jack plate rails 166. In an embodiment, a lubricant is also added to bearings 112, 114 or jack plate rails 166. By inserting bearings 112, 114 into jack plate rails 166, motor lift 102 is pressure fit within spacing brackets 160, 162 of jack plate mounting assembly 104.

Actuator 106 is generally attached to motor lift 102 and jack plate mounting assembly 104. Actuator 106 is attached to actuator mount 116 of motor lift and actuator mount 165 of jack plate mounting assembly 104. Actuator 106 is operably connected to a power source (not shown). As described earlier, in one embodiment, the power source provides electrical power. In other embodiments, the power source provides hydraulic power or other types of power.

Embodiments of the invention include one or more springs to compensate for the weight of outboard motor 60. Larger, heavier motors can cause excessive load on actuator 106, requiring actuator 106 to be larger, rated for larger loads, heavier, more durable, and/or otherwise suited for the extra weight associated with large motors. Such measures can increase the cost, maintenance, power requirements, rated wiring or piping, and other considerations associated with actuator 106. Using springs according to embodiments of the invention to compensate for the weight of motor 60 eliminates a number of these requirements and provides other advantages.

According to one embodiment, spring 300 is provided to compensate for the weight of motor 60 and motor lift plate 110. For simplicity of illustration, a single spring 300 is illustrated on the left-hand side of jack plate 100 as viewed in FIGS. 1 and 2, but it should be appreciated that embodiments of the invention optionally include a second, identical spring 300, in a corresponding position on the right-hand side of jack plate 100 as viewed in those figures. Spring 300 is optionally a gas spring that includes piston 305 received in cylinder 310 in a telescoping arrangement. Gas spring 300 is filled with nitrogen or other inert gas, and is constructed as a compression gas spring to exert an outwardly directed force in the longitudinal direction upon compression, as will be appreciated by those of ordinary skill in the art upon reading this disclosure. Any number of different types of gas springs are contemplated according to embodiments of the invention, including off-the-shelf gas springs readily available in the marketplace. The level of force necessary to compress spring 300, and the amount of outward force exerted by spring 300 upon compression, is optionally adjustable.

To mount each gas spring 300, motor lift plate 110 includes one or more flanges 315, disposed on opposite sides of lift plate 110. Flanges 315 include mounting apertures 320 for receiving suitable mounting hardware 325 for the upper end of gas spring 300. Although cylinder 310 is at the upper portion of spring 300 as viewed in the figures, it will be appreciated upon reading this disclosure that piston 305 can be placed as the upper end of spring 300 instead. The opposite end of each spring 300 is attached to respective apertures 330 disposed, for example, on the inner sides of spacing brackets 160, 162. Suitable mounting hardware 335 connects each spring 300 to apertures 330.

Those of ordinary skill in the art will appreciate, upon reading this disclosure, that the upper end of spring 300 alternatively can be attached to the major plane of lift plate 110 (the plane perpendicular to flanges 315). Suitable apertures can be provided in lift plate 110 to receive suitable mounting hardware for spring 300. It will also be appreciated that the lower end of spring 300 can be mounted to other portions of jack plate mounting assembly 104, including transom plate 164, if desired.

Figure 4:
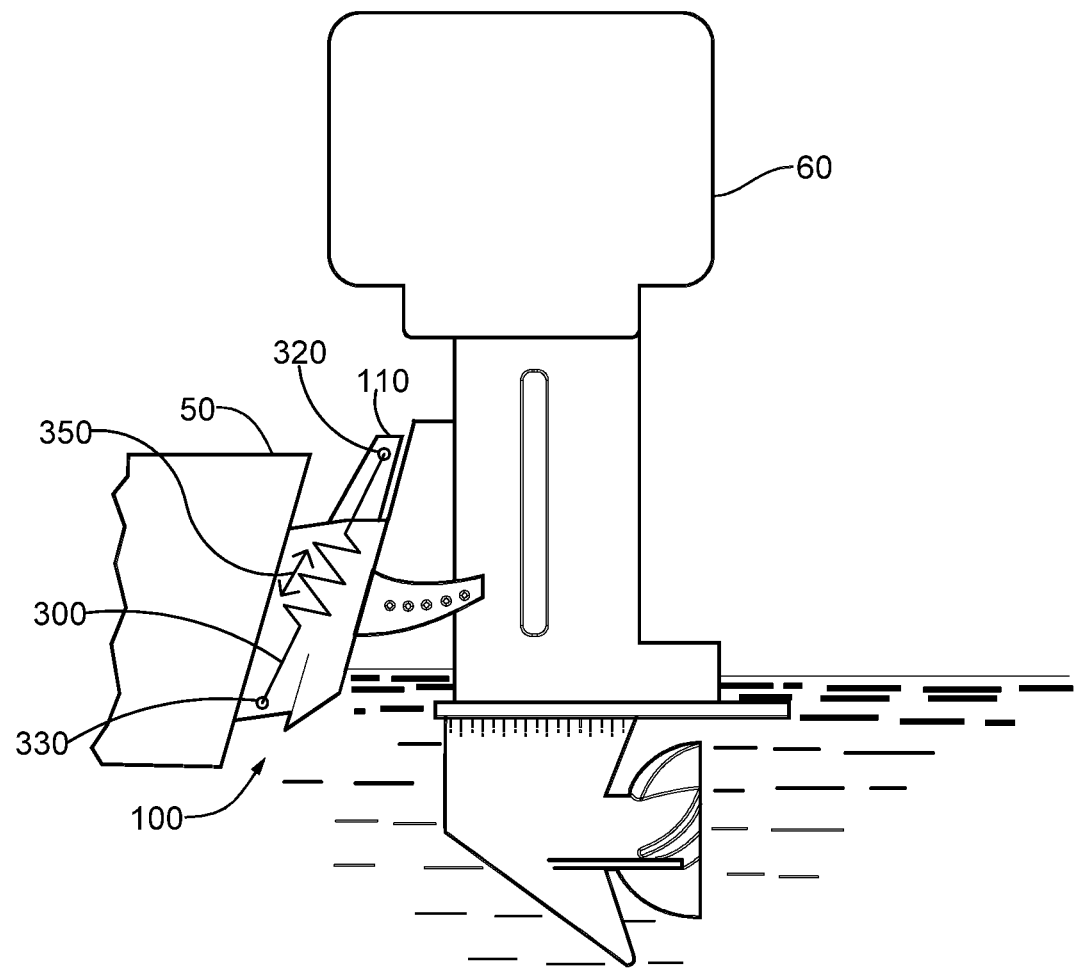
FIG. 4 is a side view of a lift plate according to an embodiment of the present invention mounted to a boat and an outboard motor, with a compression spring shown schematically, according to an embodiment of the invention.
Figure 5:
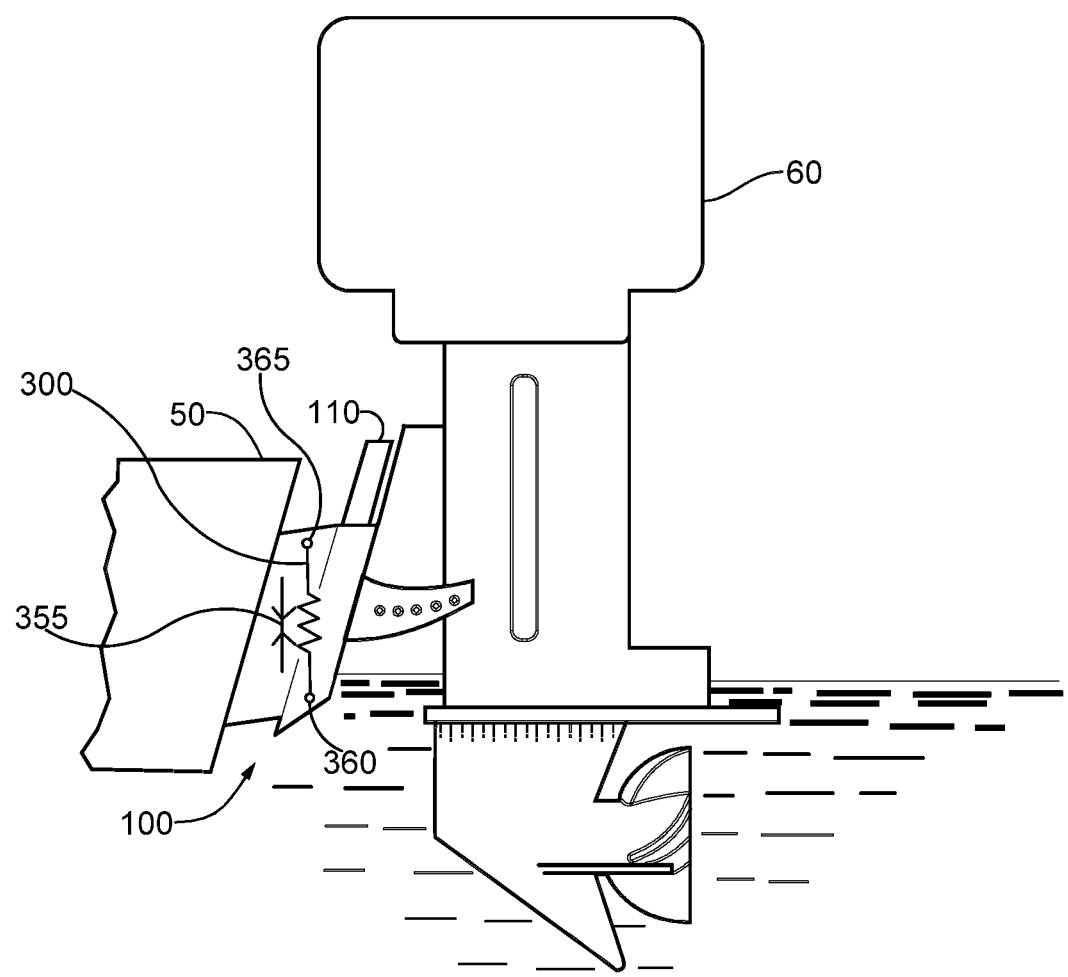
FIG. 5 is a side view of a lift plate mounted to a boat and an outboard motor, with a tension spring shown schematically, according to an embodiment of the invention.
Figure 6:
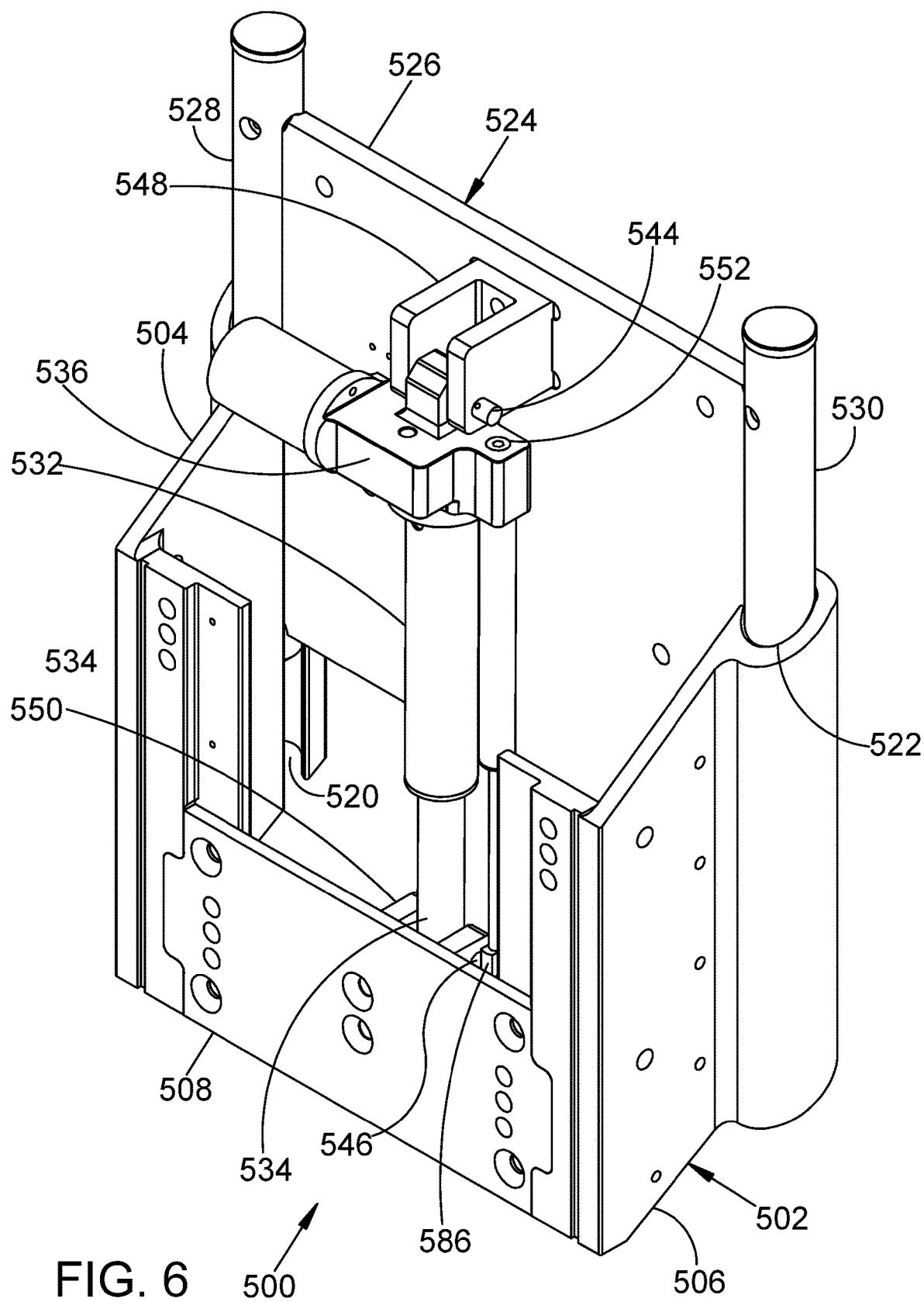
FIG. 6 is a perspective view of a jack plate in accordance with the detailed description.
Figure 7:
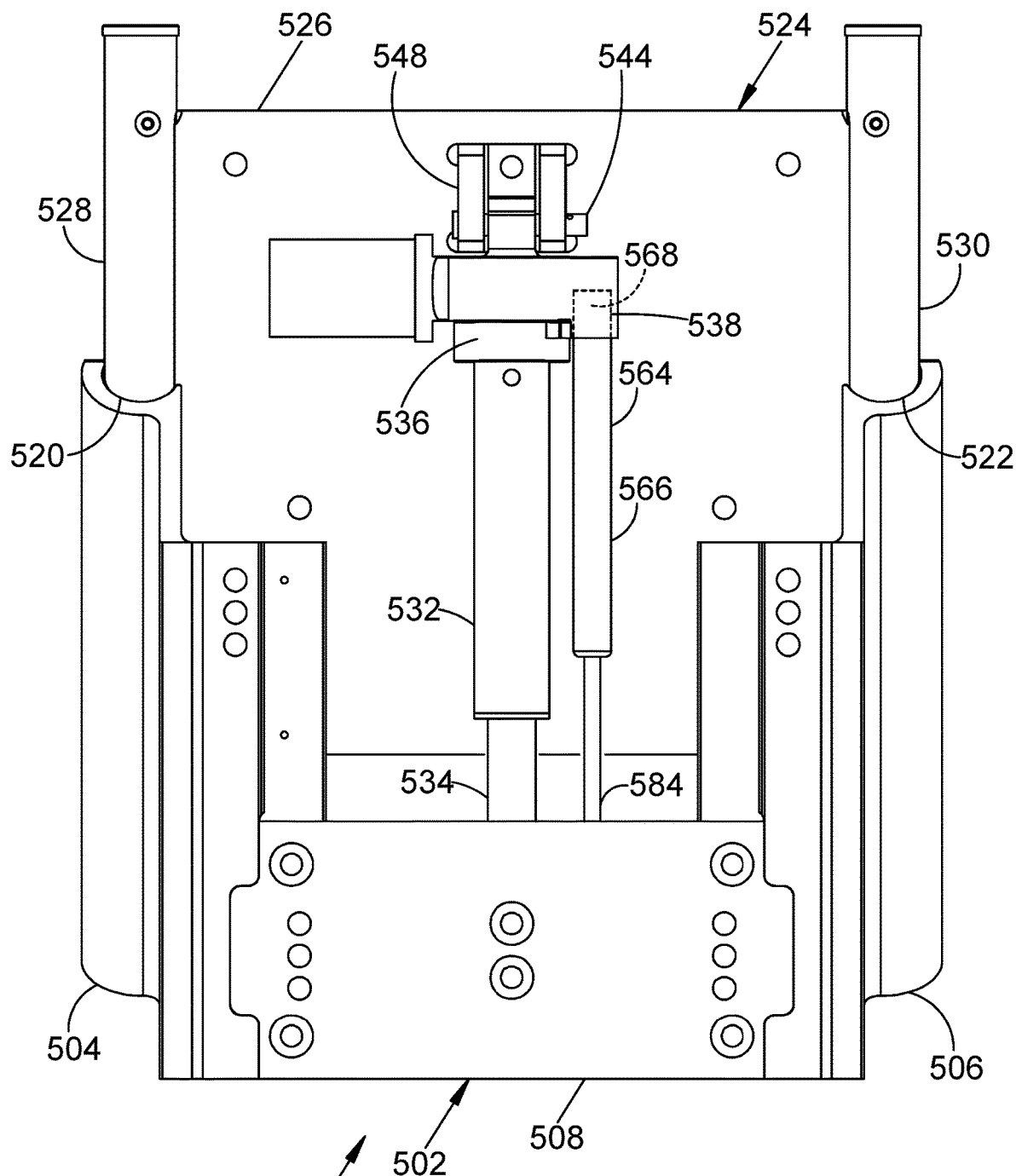
FIG. 7 is a side view of a jack plate in accordance with the detailed description.
Figure 8:
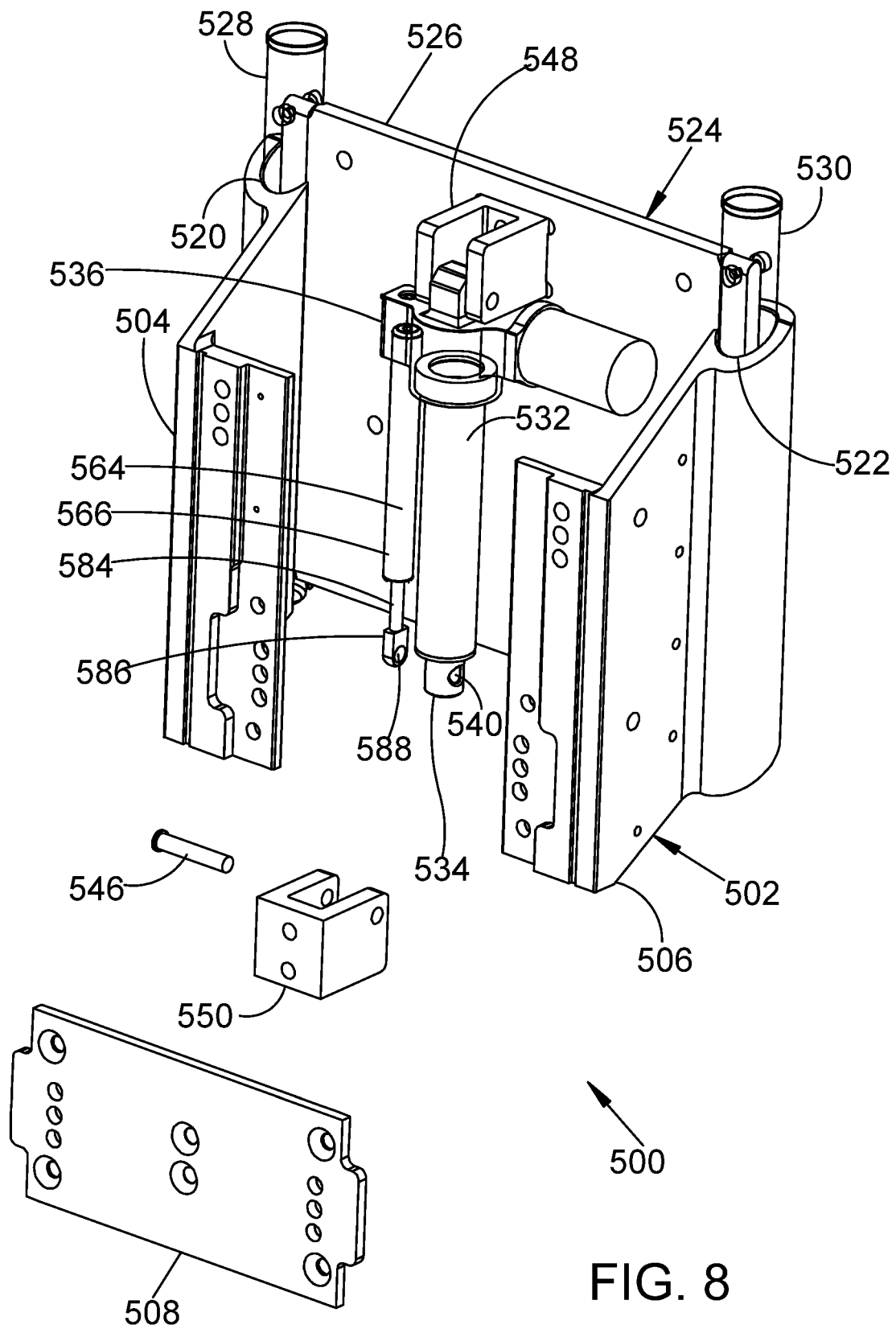
FIG. 8 is a partially exploded perspective view of a jack plate in accordance with the detailed description.
Figure 9:
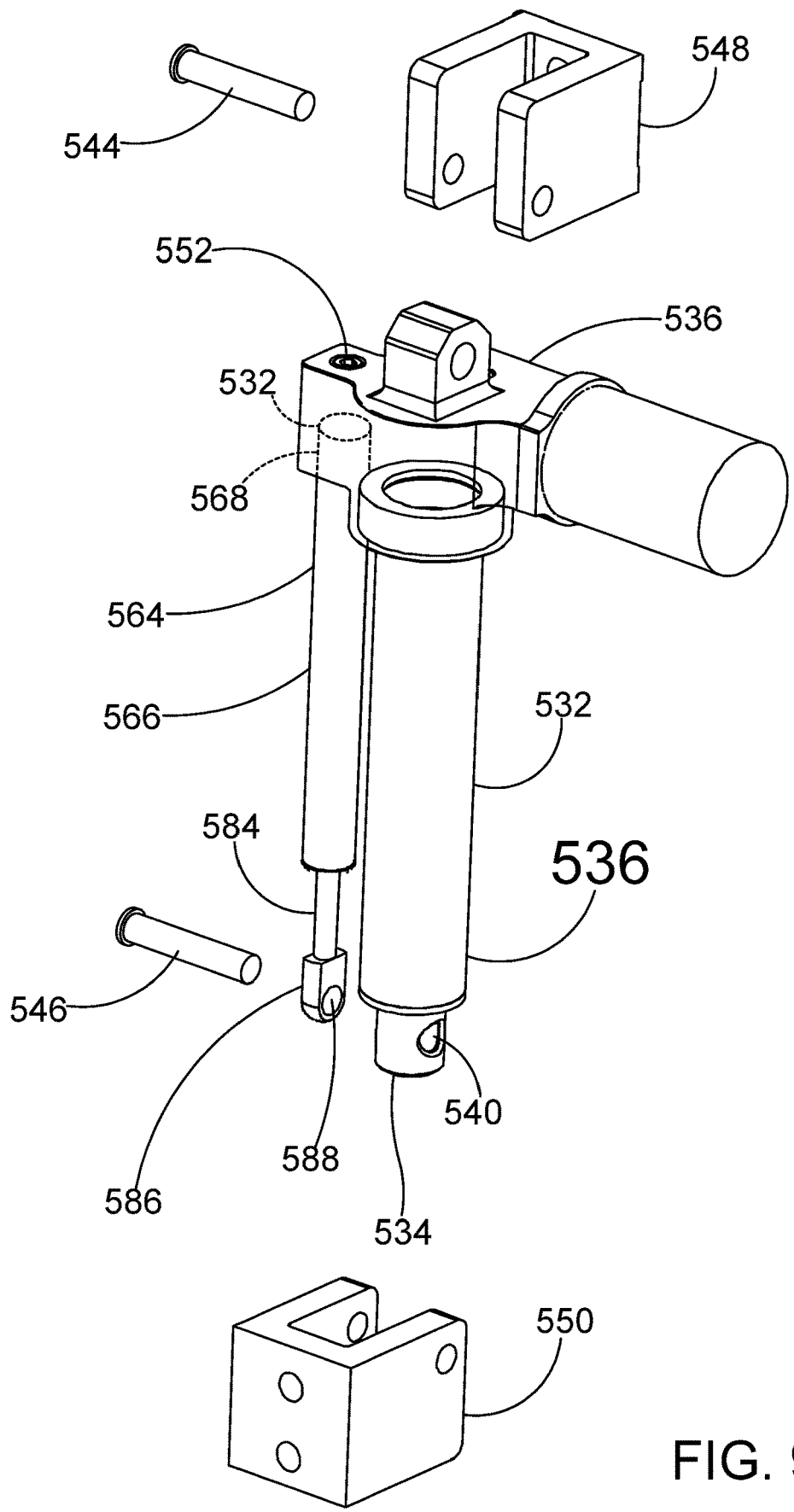
FIG. 9 is a partially exploded perspective view further illustrating a portion of the jack plate shown in FIG. 8.
Figure 10:
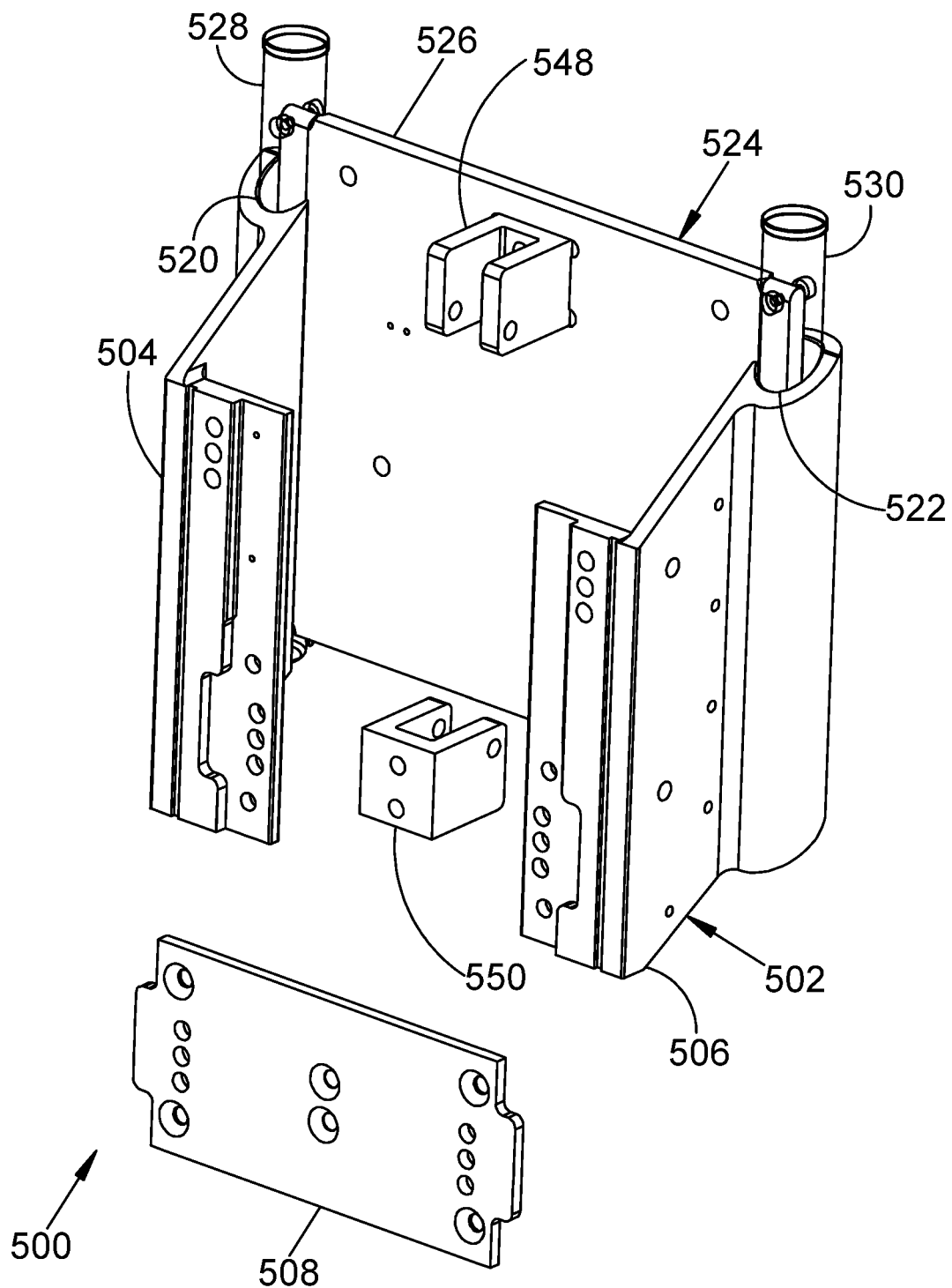
FIG. 10 is a partially exploded perspective view further illustrating a portion of the jack plate shown in FIG. 8.

To install jack plate 100, transom plate 164 is attached to the transom of boat 50 and lift plate 110 is attached to outboard motor 60, as depicted in FIGS. 4-5. Fastening members are inserted through transom-mounting apertures of spacing brackets 160, 162 and transom plate 164. Fastening members are also inserted through motor-mounting apertures 134 of lift plate 110. Compression gas spring 300 or other type of spring is installed under compression loading between motor lift 102 and jack plate mounting assembly 104, e.g. operably coupled between motor lift plate 110 and transom plate 164 or spacing brackets 160, 162. Other features and details related to and in combination with embodiments of the present invention are described in U.S. Pat. Nos. 8,627,779 and 8,267,025, incorporated by reference above.

In operation, jack plate 100 raises and lowers the depth of motor 60 within the water through the manipulation of controls operably connected to actuator 106, such as, for example, to adjust the trim of boat 50 within a body of water. Jack plate 100 is generally mounted to the transom of boat 50. Since jack plate mounting assembly 104 is fixedly attached to boat 50, movement of actuator 106 causes a corresponding movement of motor lift 102. Therefore, as actuator 106 is extended, motor lift 102 rises in relation to jack plate mounting assembly 104, causing motor 60 to be raised toward the surface of the water. Similarly, as actuator 106 is retracted, motor lift 102 descends in relation to jack plate mounting assembly 104, causing motor 60 to be lowered further below the surface of the water. Spring 300 reduces the amount of force that must be applied by actuator 106 to effect the raising and lowering of motor 60. Embodiments of the invention thus provide spring force to unload the jack plate and allow for easier raising and lowering of outboard motors relative to associated boats or other watercraft. Embodiments of the invention provide for use of a less powerful, smaller, lighter weight, and/or less expensive actuator, or provide easier manual operation. Longevity of the actuator is enhanced, reducing the possibility of costly repair or replacement, untimely breakdowns, or other disadvantages.

FIG. 4 schematically illustrates spring 300 as a compression spring, as indicated by outwardly directed force arrows 350. The upper end of spring 300 is attached or otherwise operably coupled with an upper portion of motor lift plate 110 at aperture or other feature 320 thereof, and the lower end of spring 300 is attached at aperture or other feature 330 of jack plate mounting assembly 104. Embodiments of the invention also contemplate that spring 300 is an extension spring, which extends to create load instead of compressing to create load. FIG. 5 schematically illustrates spring 300 as an extension spring, as indicated by inwardly directed force arrows 355. In this example, the lower end of spring 300 is attached at aperture 360 (see also FIG. 3) of motor lift plate 110, and the upper end of spring 300 is attached at aperture 365 to an upper portion of jack plate mounting assembly 104. Extension gas spring 300 or other type of spring is installed under tension loading between motor lift 102 and jack plate mounting assembly 104, e.g. operably coupled between motor lift plate 110 and transom plate 164 or spacing brackets 160, 162.

Referring to FIGS. 6 through 12, in an embodiment, a jack plate 500 comprises a mounting assembly 502 comprising a first spacing bracket 504, a second spacing bracket 506, and a transom plate 508 extending between the first spacing bracket 504 and the second spacing bracket 506. The first spacing bracket 504 defines a first channel 520 and the second spacing bracket 506 defines a second channel 522 with the first channel 520 and the second channel 522 opening toward one another. The jack plate 500 further includes a lift plate assembly 524 that is movable relative to the transom plate 508. The lift plate assembly 524 comprises a first slider 528 slidingly received in the first channel 520, a second slider 530 slidingly received in the second channel 522, and a lift plate 526 extending between the first slider 528 and the second slider 530. An actuator 532 of the jack plate 500 is operably coupled between the mounting assembly 502 and the lift plate assembly 524 for moving the lift plate assembly 524 relative to the mounting assembly 502. A spring 564 of the jack plate 500 is operably coupled between the mounting assembly 502 and the lift plate assembly 524. The spring 564 applies a biasing force between the lift plate assembly 524 and the mounting assembly 502. The spring 564 comprises a spring housing 566 having a housing wall 572 defining in a cylinder bore 574 and a piston 576 disposed inside the cylinder bore 574. The piston 576 separates a first part 578 of the cylinder bore 574 from a second part 580 of the cylinder bore 574. A pressurized gas 582 is disposed in the first part 578 of the cylinder bore 574. A pattern of dots is used to illustrate pressurized gas 582 in the figures. The second part 580 of the cylinder bore 574 is in fluid communication with the outside atmosphere A. The outside atmosphere A has an atmospheric pressure and the pressurized gas 582 has a pressure that is greater than the atmospheric pressure so that there is a pressure differential across the piston 576. The spring housing 566 also has an end portion 568 comprising the female mounting thread 570 that is co-axial with the cylinder bore 574. The actuator 532 includes an actuator casing 536 that defines a socket 538 dimensioned to receive the end portion 568 of the spring housing 566. In the embodiment shown in the figures, the end portion 568 of the spring housing 566 is disposed in the socket 538 defined by the actuator casing 536. In the embodiment shown in the figures, the end portion 568 of the spring housing 566 is fixed to the actuator casing 536 by a mounting screw 552. The mounting screw 552 is disposed in threaded engagement with the female mounting thread 570.

Referring to FIGS. 6-10, the piston 576 further comprises a piston rod 584 having a first end portion fixed to the piston 576 and a second end portion fixed to a clevis 586. In this embodiment, the clevis 586 is pivotally coupled to the transom plate 508 by a lower pin 546 extending through a clevis hole 588 defined by the clevis and corresponding holes defined by a lower mounting bracket 550.

Referring to FIGS. 6-10, the actuator casing 536 is pivotally coupled to the lift plate 526 by an upper pin 544 extending through an upper mounting hole 540 defined by the actuator rod 534 and corresponding holes defined by an upper mounting bracket 548. In this embodiment, the upper mounting bracket 548 is fixed to the lift plate 526.

Referring to FIGS. 6-10, the actuator 532 further comprises an actuator rod 534 defining an lower mounting hole 542, the actuator rod 534 being pivotally coupled to the transom plate 508 by a lower pin 546 extending through the lower mounting hole 542 and corresponding holes defined by a lower mounting bracket 550. In this embodiment, the lower mounting bracket 550 is fixed to the transom plate 508.

Referring to FIGS. 6 through 10, it will be appreciated that a jack plate 500 may including a spring mounted to the right of the actuator, a spring mounted to the left of the actuator, or both.

Figure 11:
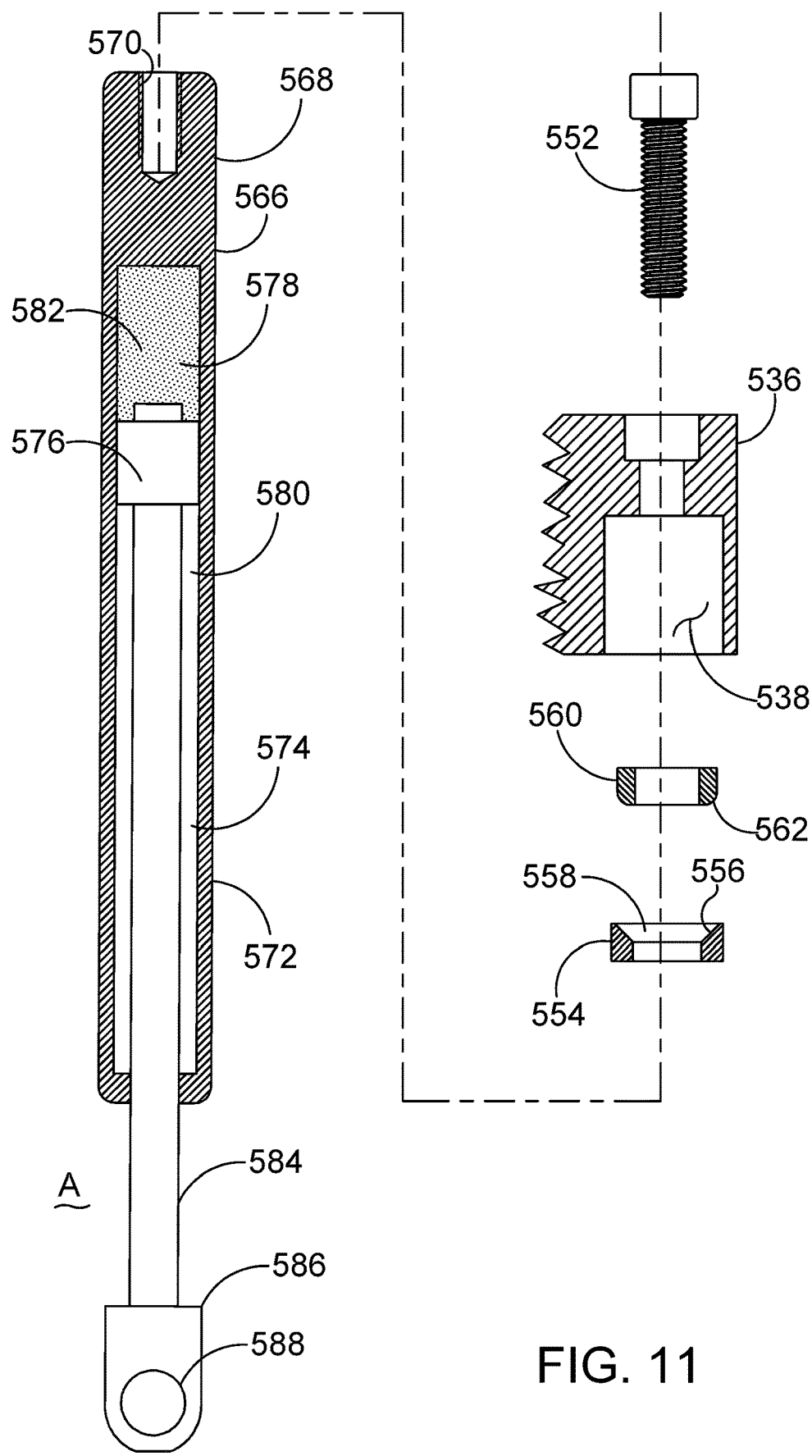
FIG. 11 is an exploded cross-sectional view further illustrating the mounting of a spring to an actuator housing shown in FIG. 11.
Figure 12:
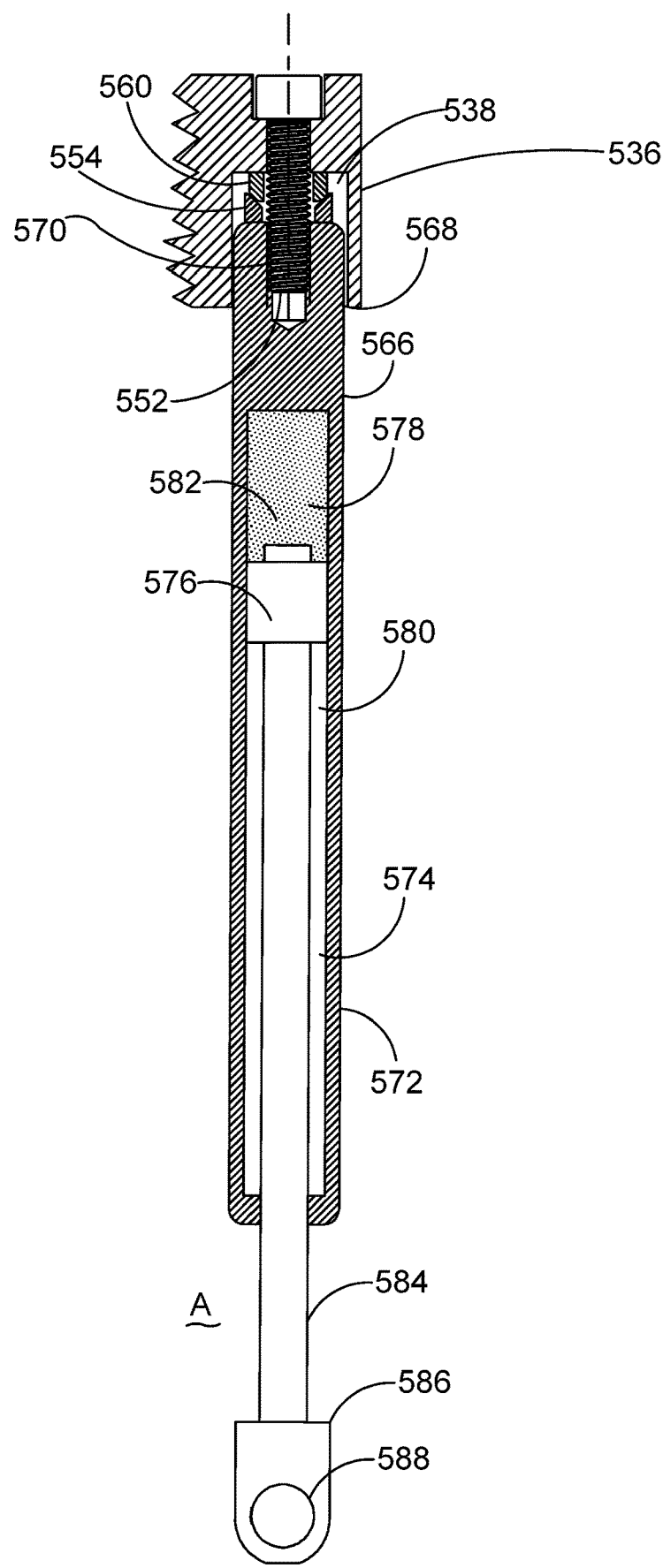
FIG. 12 is a cross-sectional view further illustrating the mounting of a spring to an actuator housing as shown in FIG. 11.

Referring to FIG. 11 and FIG. 12, the spring 564 of the jack plate 500 further includes a male washer 560 and a female washer 562 disposed inside the socket 538 defined by the actuator casing 536 with the mounting screw 552 extending through the male washer 560 and the female washer. The male washer 560 and the female washer 562 are disposed between an upward facing surface of the end portion 568 of the spring housing 566 and a downward facing surface of the actuator casing 536. The female washer 562 comprises a female surface 556 defining a cavity 558. The male washer 560 comprises a male surface 562. The male surface 562 of the male washer 560 is received in the cavity 558 defined by the female surface 556 of the female washer 562. In an embodiment, the male surface 562 of the male washer 560 is seated against and in contact with the female surface 556 of the female washer 562. In an embodiment the male surface 562 of the male washer 560 comprises at least one convex surface. In an embodiment the female surface 556 of the female washer 562 comprises a concave surface. In an embodiment the cavity 558 defined by the female surface of the female washer 562 has a shape corresponding to a cone.

Referring to all FIGS. 1-12, in an embodiment, the spring 564 of the jack plate 500 is biased to expand in length and the spring 564 is allowed to extend in length while the actuator 532 is activated to raise the lift plate 526. In an embodiment, the spring 564 is biased to expand in length and the actuator 532 prevents the spring 564 from expanding in length when the actuator 532 is not activated. In an embodiment, the spring 564 is biased to expand in length and the spring is forced to contract in length while the actuator 532 is activated to lower the lift plate 526.

Although gas springs are described for use with embodiments of the invention, the invention is not limited to gas springs. Other spring types are contemplated as well, for example helical springs, torsion springs, drawbar springs, and constant force springs, all optionally enclosed within a suitable casing, housing, or protective covering.

Although the present invention has been described with reference to particular embodiments, those skilled in the art will recognize that changes may be made in form and substance without departing from the spirit and scope of the invention. The embodiments described above are intended to be illustrative and not limiting.

The invention claimed is:
1. A jack plate comprising:
a mounting assembly comprising a first spacing bracket, a second spacing bracket, the first spacing bracket defining a first channel, the second spacing bracket defining a second channel, the first channel and the second channel opening toward one another;
a lift plate assembly comprising a first slider slidingly received in the first channel, a second slider slidingly received in the second channel, and a lift plate extending between the first slider and the second slider;
an actuator operably coupled between the mounting assembly and the lift plate assembly for raising and lower the lift plate assembly relative to the mounting assembly; and
an upright gas spring operably coupled between the mounting assembly and the lift plate assembly, the spring applying a biasing force between the lift plate assembly and the mounting assembly to unload the jack plate allowing for easier raising and lowering of an outboard motor mounted on the lift plate and utilization of the actuator with less power that what would otherwise be required.

2. The jack plate of claim 1, wherein the actuator is mechanical.

3. The jack plate of claim 1, wherein the actuator is electrified.

4. The jack plate of claim 1, wherein the actuator is driven by an associated motor controlled by a control switch.

5. The jack plate of claim 1, wherein the first and second channels are lubricated.

6. The jack plate of claim 1, wherein the gas spring comprises an inert gas.

7. The jack plate of claim 1, wherein the gas spring provides a biasing force in a direction substantially the same as a direction of an actuating force provided by the actuator.

8. The jack plate of claim 1, wherein the gas spring provides a biasing force in a direction substantially the opposite as a direction of an actuating force provided by the actuator.

9. The jack plate of claim 1, wherein the mounting assembly comprises a first flange and the lift plate assembly comprises a second flange, the first and second flanges being orthogonal to the lift plate.

10. The jack plate of claim 9, wherein a first end of the actuator is coupled to the first flange and a second end of the actuator is coupled to the second flange.

11. The jack plate of claim 1, wherein the jack plate comprises a second gas spring operably coupled between the mounting assembly and the lift plate assembly.

12. A jack plate comprising:
a mounting assembly configured for attachment to an exterior of a boat comprising a first channel opposite a second channel and a first flange;
a lift plate assembly comprising a first slider slidingly received in the first channel, a second slider slidingly received in the second channel, a second flange, and a lift plate extending between the first slider and the second slider;
an actuator operably coupled between the mounting assembly and the lift plate assembly for raising and lower the lift plate assembly relative to the mounting assembly; and
an upright gas spring operably coupled between the first flange and the second flange, the spring applying a biasing force between the lift plate assembly and the mounting assembly to unload the jack plate.

13. The jack plate of claim 12, wherein the first flange is coupled to a piston of the upright gas spring.

14. The jack plate of claim 12, wherein the first flange is coupled to a cylinder of the upright gas spring.

15. The jack plate of claim 12, wherein the gas spring is installed under tension.

16. The jack plate of claim 12, wherein the actuator is pivotally coupled to the lift assembly.

17. The jack plate of claim 12, wherein the actuator is pivotally coupled to the mounting assembly.

18. The jack plate of claim 12, wherein the gas spring is pivotally coupled to the lift assembly.

19. The jack plate of claim 12, wherein the gas spring is pivotally coupled to the mounting assembly.

* * * * *